March 5, 1968 R. D. NEYER 3,371,539
COMPENSATING MECHANISM FOR INDICATOR
Filed Dec. 27, 1965 2 Sheets-Sheet 1

INVENTOR.
Robert D. Neyer
BY
ATTORNEYS.

March 5, 1968 R. D. NEYER 3,371,539
COMPENSATING MECHANISM FOR INDICATOR
Filed Dec. 27, 1965 2 Sheets-Sheet 2
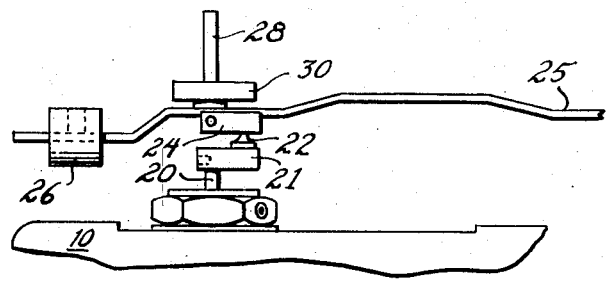
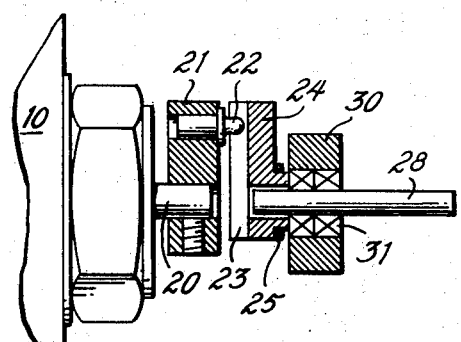
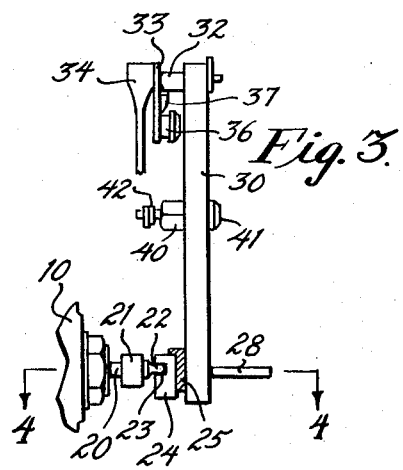
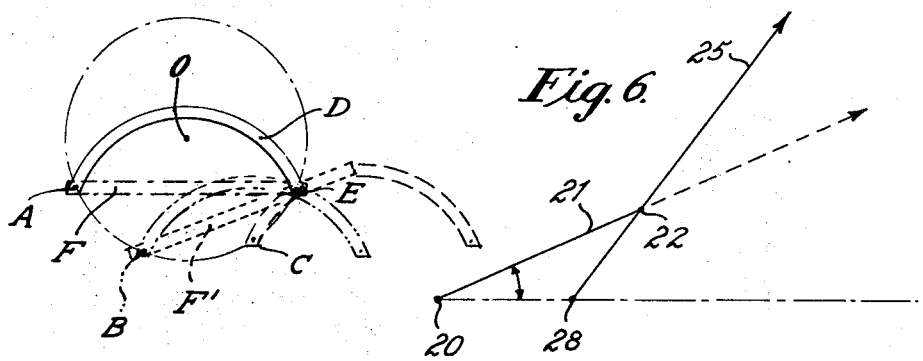
INVENTOR.
Robert D. Neyer
BY
ATTORNEYS.

3,371,539
COMPENSATING MECHANISM FOR INDICATOR
Robert D. Neyer, Oreland, Pa., assignor to Yarway Corporation, Philadelphia, Pa., a corporation of Pennsylvania
Filed Dec. 27, 1965, Ser. No. 516,546
5 Claims. (Cl. 73—432)

The present invention relates to compensating an indicator for an independent variable and more particularly to improvements in the construction of the compensating mechanism.

The present invention represents improvements over the compensating mechanism described and claimed in Kinderman U.S. Patent No. 2,869,371, issued on Jan. 20, 1959.

This mechanism is used, for example, for compensating pressure differential gauges such as the one disclosed and claimed in Kinderman U.S. Patent No. 2,509,644, issued May 30, 1950, which is incorporated herein by reference. These pressure gauges are compensated for changes in a variable other than the variable primarily indicated such as the variation in density of water in a liquid level gauge with change in pressure. They operate on the basis of a multiplying mechanism driven preferably by a Bourdon tube element which introduces an algebraic factor to the indicator arm of the gauge to cause additional travel of the arm as compared to the uncompensated movement of the arm in response to an equal pressure differential. The magnitude of the factor depends upon the pressure and closely follows the pressure density curve.

As shown in the Kinderman Patent No. 2,869,371, which is incorporated herein by reference, the Bourdon tube changes the pivot point of the indicator arm with respect to the axis of a primary arm that indicates the primary variable, the two arms being pivotably interconnected at a point remote from their respective axes.

In the prior art device, as aforementioned, the deflection of the Bourdon tube creates a moment arm of force on the compensating arm housing the pivot of the indicator arm to compensate the arm, a variable element being provided biased against the deflection of the tube in order to vary the amount of force necessary to displace the indicator arm pivot. By this invention the compensating mechanism has been improved by eliminating the need for this biased element and additionally by providing a more accurate path of travel for the displacement of the indicator arm pivot.

Accordingly an object of this invention is to provide an improved compensating mechanism for a pressure differential gauge.

A further object of this invention is to provide a variable moment arm adjustment in order to vary the degree of force required to actuate the compensating mechanism.

A further object of this invention is to provide a compensating system for a primary indicator that utilizes an adjustable compensator lever that varies the amount of force exerted by the compensator on the gauge in its adjustment of the relative distances between the primary and indicator arm axes.

A further object of this invention is to provide a compensating mechanism that compensates the gauge in response to changes in a variable without substantial movement of its indicator arm.

A further object of this invention is to provide a path of travel for the displacement of the pivotable interconnection between the arms of the gauge compatible with the arcing motion of the compensator lever in response to the force exerted on the lever by the compensator.

Further objects will become apparent from the following description of the drawings.

FIGURE 2 is a fragmentary view of the compensating mechanism taken along the lines 2—2 of FIGURE 1, eliminating the Bourdon tube.

FIGURE 3 is a fragmentary side elevation of the compensating mechanism taken along the lines 3—3 of FIGURE 1, eliminating the Bourdon tube.

FIGURE 4 is an enlarged fragmentary sectional view of the pivotable interconnection between the primary arm and the indicator arm axis.

FIGURES 6 and 7 are schematic diagrams useful in explaining the invention.

Figures 1, 5:
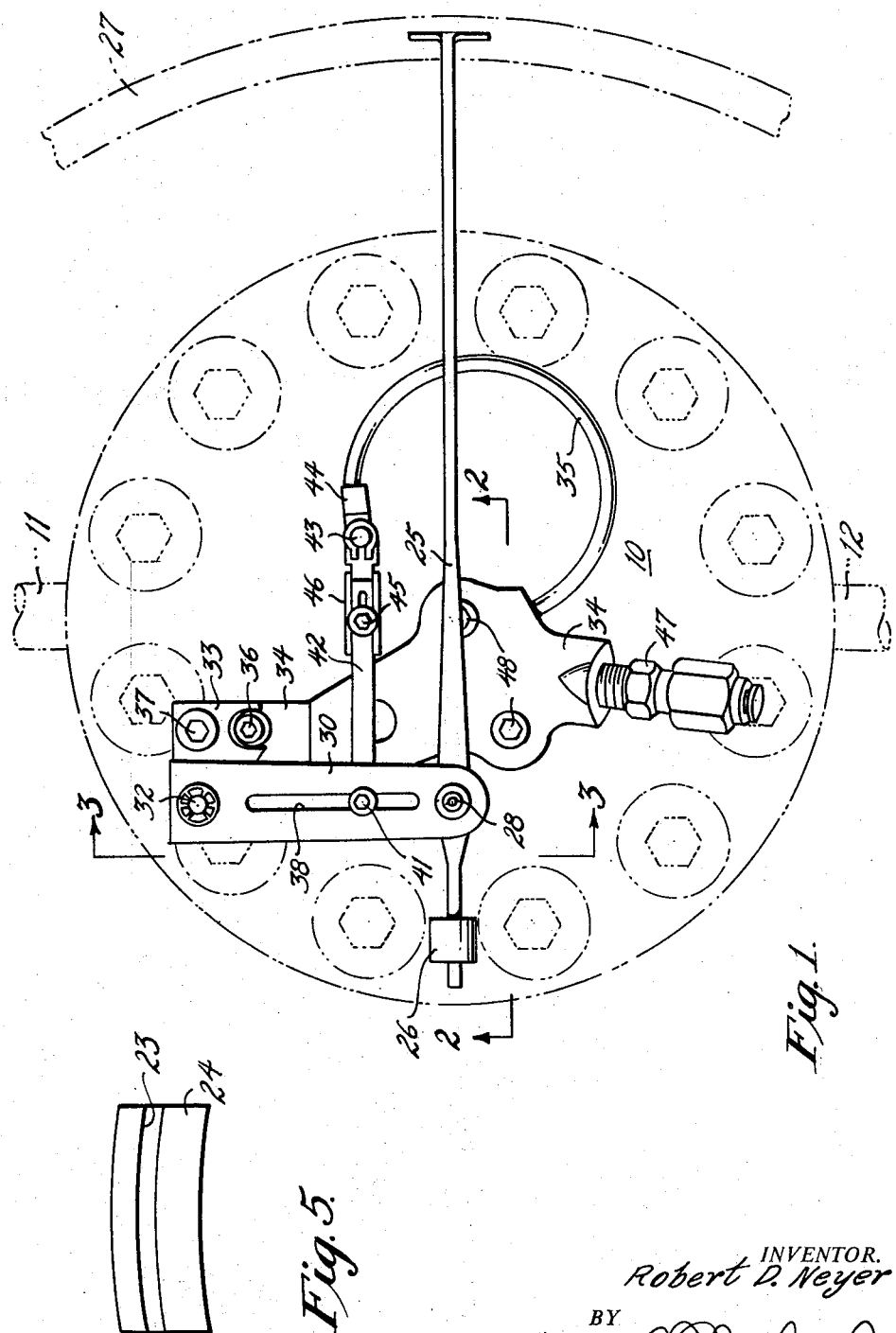
FIGURE 1 is a front elevation of a compensating mechanism embodying the objects of this invention, the mechanism being attached externally to the side of a pressure differential gauge.
FIGURE 5 is an enlarged fragmentary view of the hub of the indicator arm.

Describing in illustration but not in limitation and with reference to the drawngs:

In FIGURE 1 there is shown a primary indicator housing 10 depicted in phantom comprising pipes 11 and 12 for supplying pressure differentials to the gauge. This gauge is adequately described in the above two mentioned patents and hence further explanation of the gauge is not necessary here. The actuation of the gauge by the pressure differential ultimately produces angular rotation of the primary indicator shaft 20 emanating from the housing 10. The purpose of the compensating mechanism is to alter the path of travel of the indicator arm for variations in density due to higher pressures in the liquid being measured. Correction for variations in density to maintain accurate level indication becomes important to most users at pressures above 1500 p.s.i.

On the outer end of the shaft 20 there is mounted suitably with a set screw a crank arm 21 carrying a crank pin 22 at its outer end. The crank pin rides in a slot 23 in the hub 24 of the indicator arm or pointer 25. The pin 22 is mounted for both rotational movement and translational movement within the slot 23. With reference to FIGURE 5, the slot 23 has a degree of curvature to it which will be explained later in the discussion of the operation of the compensating mechanism.

The indicator arm or pointer 25 includes a counterweight 26 and may have any desired contour as shown so as to fit around protruding elements in the gauge, the arm extending across a scale 27 at its outer extremity thus indicating the primary variable of the gauge.

The pointer pivots about shaft 28, the shaft being mounted for rotation in one end of the compensating lever 30, roller or ball bearings 31 being provided between the lever and the shaft to minimize friction. The compensating lever pivots at 32 on eccentric mounting plate 33 which is adjustably secured to the bracket 34 of the Bourdon tube 35. Eccentric screw 36 permits variation in the pivot position of the compensator lever at the time of the assembly of the gauge, the clamping screw 37 securing it in the desired position.

Intermediate to the ends of the compensating lever is an elongated slot 38 into which is slidably mounted pivot post 40 adapted to be secured at the desired position within the slot by tightening means 41. Pivotably mounted to the pivot post 40 is compensator range adjustment link 42 which at its opposite end pivotably interconnects at 43 to the tip 44 of the Bourdon tube 35 mounted in bracket 34. The link consists of two parts joined by a screw and slot connection 45, the end of the link 42 riding between guides 46 so that the length of the link can be properly adjusted at the time of assembly of gauge.

The Bourdon tube is hollow and connects through a passage in the interior of the bracket 34 with a nipple connection 47 which is directly connected to the differential pressure space in the interior of the gauge. The Bourdon tube bracket is suitably affixed to the external housing of the gauge through bolts 48.

In operation, with the pointer arm 25 at mid scale, as shown in FIGURE 1, and the pivot post 40 of link 42 in the slot 38 as shown, the pointer extends approximately perpendicular to the compensating lever 30. The rotation of primary indicator shaft 20 in response to a pressure differential within the gauge rotates crank arm 21 and hence the pointer 25 through crank pin 22. As explained above and in the prior Kinderman Patent No. 2,869,371, the purpose for providing this crank pin-slot arrangement between the primary indicator axis and the pointer axis is to vary the range of the pointer to compensate it for density variations, the pointer being adjusted by the pressure sensitive element represented in this case by the Bourdon tube. The Bourdon tube 35 is sensitive to pressure within the gauge and upon an increase in pressure, it will deflect expanding its radius of curvature and creating a force on the compensating lever tending to pull it to the right in FIGURE 1. Deflection of the tube displaces the pointer shaft axis 28 with its attached hub 24 to the right and away from alignment with the primary indicator axis 20, thus longitudinally changing the position of the crank pin 22 with respect to the slot 23.

When the pivot point 28 of the indicator arm is on the same center line as the primary indicator axis 20, at the null position of the compensating Bourdon tube, angular rotation of the primary axis will create the same degree of rotation in the pointer. However, with movement of the pointer pivot toward the crank pin 22 and away from the primary axis, the range of the pointer is increased with the same degree of angular rotation of the primary axis.

This can best be explained by reference to FIGURE 6 where point 20 is the primary axis, 21 the crank arm, 22 the crank pivot pin slidably mounted onto the pointer arm 25 pivoting at 28. Since pivots 20 and 28 are not in the same vertical plane, when pivot 28 is superimposed upon pivot 20, arm 25 will swing with the crank arm 21 to the position as shown in phantom from the horizontal. However, if the pointer pivot 28 is moved to the position shown, the two arms still pivoting at 22, it can be seen that the pointer now travels a greater distance for the same angular rotation of the crank arm 21. In operation, however, the pivot 28, as explained below, traverses an arc in being displaced from its superimposed position with axis 20, but it has been depicted here along a straight line for ease of illustration.

Since the compensator lever 30 pivots about point 32 the movement of the pointer or indicator arm axis 28 is on an arc of a circle having a radius equal to the length of the compensator lever. Since the hub 24 travels in this arc with the pointer axis, the slot 23 in the hub is provided with a reverse arc of radius equal to that of the compensator lever, in order to compensate for this movement of the pointer axis 28, the curved slot being shown in FIGURE 5.

The reason for this will be better understood by reference to FIGURE 7 wherein the arc traversed has been greatly exaggerated for ease of illustration. Setting the pivot of the pointer initially at A, for example, on the arc of a circle having an axis O, the pivot A rotates about O as it is compensated, moving along the arc from A to C. Assuming that curved slot D is the slot in the hub 24, it has the reverse but same radius of curvature as the circle and engages a crank pin E representing pin 22 on the same arc. As the pointer pivot 28 moves along the arc from A to B, and around C, the slot in the hub of the pointer will follow a path as shown in phantom. It can thus be seen that regardless of the position of the pointer pivot A on the arc, that the crank pin E will always be engaged by the slot D, the slot moving transversely with A but without rotation about it.

Hence in this mechanism as the compensator lever displaces the pointer pivot and hub assembly, the relative position between the hub and the crank pin will remain substantially the same, the pin moving along the slot creating no rotational movement of the hub. If this slot were straight, as in the prior art device, the pointer would have to pivot slightly about its axis during compensation in order to keep the pin and slot in proper alignment. For example, a straight slot as represented by the phantom line F, would have to assume the position F′ as depicted in FIGURE 7 when the pointer pivot 28 moved from point A to point B on the same arc. This would require the pointer to pivot about its axis and thus changing its position with respect to the scale.

Hence the use of a curved hub slot in this invention permits adjustment between the primary indicator axis and the pointer shaft axis without requiring a change in the indicator arm with respect to its scale. The long arc used in FIGURE 7 has only been used for illustrative purposes, for the arc slot is in actuality relatively short as shown in FIGURE 5. Nevertheless, the compensating curvature no matter how slight substantially prevents movement of the pointer as the gauge is being compensated by the Bourdon tube thus eliminating indicator inaccuracies which have occurred in the past in a straight slot prior art mechanism.

In the compensating mechanism described in the Kinderman Patent No. 2,869,371, the degree of compensation could be adjusted to fit particular requirements, as the deflection of the Bourdon tube due to a change in the variable might produce a curve over the path of operation whose slope did not necessarily match the required variable-deflection curve. In the prior art device this was corrected by means of a leaf spring biased against the force created by the Bourdon tube. The restraining force of the spring was adjusted by means of an adjustment screw so that the restraint started from zero at the null position of the compensator or Bourdon tube. The variable spring rate superimposed on the spring rate of the Bourdon tube compensated for variable density so that the movement of the sensitive element properly followed the saturation pressure-density curve.

However, with deflection of the spring an increasingly greater restrain was placed in opposition to the compensator and thus the opposition force did not remain constant over the path of travel of the compensator. Additionally such adjustments were not always accurate as the null position of the spring and the spring rate changed with repeated use and the adjustment screw could easily over or under align the null position with such misalignment being unperceivable to the human eye.

This invention provides a simple and accurate adjustment system for the pressure sensitive Bourbon tube or similar element that eliminates the aforementioned inaccuracies. This invention provides a variable moment arm adjustment for adjusting the force exerted by the Bourbon tube on the pointer arm. The slot 38 in the compensating lever 30 permits adjustment in the distance between the lever pivot 32 and the link pivot 40. The closer the pivot 40 approaches the compensator arm pivot 32, the greater the force needed by the Bourbon tube to deflect the lever a given angular increment and vice versa.

This variable moment arm adjustment provides a means for correcting the compensator or Bourbon tube by a factor that remains substantially constant over the entire deflection of the compensator once the moment arm adjustment has been set at the desired location. The link 42 can be accurately and easily set at the proper position in the slot, according to prior calculation, as to the amount of restraint required. In this way the deflection of the primary element or Bourbon tube can be made to follow more closely the required variable-deflection curve as the constant restraint provided by hte variable moment arm adjustments keeps the actual deflection curve of the element with a constant slope.

It will be evident that once the device is set up, and all the proper adjustments made, the Bourbon tube by deflecting will automatically adjust the range of the indicator arm by compensating the same for differences in density of the liquid in the gauge due to differences in pressure.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my invention.

Having thus described my invention what I claim as new and desire to secure by Letters Patent is:

1. In an indicator including a variable compensating means, a rotatable primary indicator shaft, a crank arm mounted on the primary shaft, an indicating pointer arm pivoting about an axis remote from the axis of the indicator shaft, a slidable pin in slot connection between said crank arm and the pointer arm, said slot being curved and having a radius of curvature equal to the radius of an arc traversed by displacement of the pointer arm pivot in response to the compensating means, whereby displacement of the pointer arm pivot varies the range of travel of the pointer arm relative to the range of travel of the primary indicator shaft.

2. In an indicator according to claim 1, wherein the pin is mounted on the crank arm remote from the indicator shaft and turns in an arc about the shaft, the curved slot being mounted in a hub of the pointer arm having a curvature reverse to the curvature of the arc formed by the displacement of the pointer arm pivot.

3. In an indicator according to claim 1, wherein the center lines of the indicator shaft and the pointer arm pivot are the same at the null position of the compensating means.

4. In an indicator, a rotatable primary indicator shaft turning on an axis responsive to a primary variable, a crank arm mounted on the primary indicator shaft, an indicator pointer arm pivoting about a remote axis responsive to rotation of the indicator shaft, a slidable and pivotable interconnection between the crank arm and the pointer arm, a compensator lever pivoting about an axis at one end and supporting the axis of the pointer arm for rotation at the other, compensating means responsive to a secondary variable creating a force on the compensator lever causing it to pivot about its axis, thereby displacing the pointer arm pivot relative to the indicator shaft axis, to vary the range of travel of the pointer arm relative to the range of travel of the indicator shaft to compensate the indicator for the secondary variable, including means for adjusting the moment arm of the force exerted on the compensator lever by the compensating means.

5. In an indicator according to claim 4, wherein the adjustment means comprises a longitudinal slot in the lever arm, the compensating means being pivotally interconnected to a slidable element within the slot capable of being positively secured at any desired location within the slot.

References Cited

UNITED STATES PATENTS 2,869,371  1/1959  Kinderman et al. _____ 73—432

DAVID SCHONBERG, *Primary Examiner.*